United States Patent
Brinkmann et al.

(10) Patent No.: US 11,167,635 B2
(45) Date of Patent: Nov. 9, 2021

(54) APPARATUS AND METHOD FOR CONTROLLING A TEMPERATURE OF A VEHICLE COMPONENT BY MEANS OF AIR GUIDE MEANS

(71) Applicant: FORD GLOBAL TECHNOLOGIES, LLC, Dearborn, MI (US)

(72) Inventors: Bernd Brinkmann, Dormagen (DE); Johann Wegers, Cologne (DE); Helmut Hoyer, Königswinter (DE); Christian Jolk, Cologne (DE); Thomas Nitsche, Neuss (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 366 days.

(21) Appl. No.: 16/253,045

(22) Filed: Jan. 21, 2019

(65) Prior Publication Data
US 2019/0225077 A1 Jul. 25, 2019

(30) Foreign Application Priority Data
Jan. 22, 2018 (DE) .......................... 102018200936.8

(51) Int. Cl.
| | |
|---|---|
| *B60H 1/00* | (2006.01) |
| *B60K 11/08* | (2006.01) |
| *F01P 7/12* | (2006.01) |
| *B60S 1/66* | (2006.01) |

(52) U.S. Cl.
CPC .............. *B60K 11/085* (2013.01); *B60S 1/66* (2013.01); *F01P 7/12* (2013.01); *B60Y 2306/13* (2013.01)

(58) Field of Classification Search
CPC .......................... B60H 1/00785; B60K 11/085
See application file for complete search history.

(56) References Cited

U.S. PATENT DOCUMENTS

| | | | |
|---|---|---|---|
| 8,662,569 B2 | 3/2014 | Klop | |
| 9,103,265 B2 | 8/2015 | Okamoto | |
| 9,994,100 B1* | 6/2018 | Del Gaizo | ............. B60K 11/04 |
| 10,514,191 B2* | 12/2019 | Liu | ........................ F25B 49/025 |
| 2010/0083917 A1* | 4/2010 | Saida | ................... B60K 11/085 |
| | | | 123/41.04 |
| 2011/0288717 A1* | 11/2011 | Yu | ......................... B60K 11/085 |
| | | | 701/31.4 |
| 2012/0111652 A1* | 5/2012 | Charnesky | ................ F01P 7/10 |
| | | | 180/68.1 |

(Continued)

FOREIGN PATENT DOCUMENTS

JP 2013208938 A 10/2013

OTHER PUBLICATIONS

English Machine Translation of JP2013208938A dated Oct. 10, 2013.

*Primary Examiner* — Long T Tran
(74) *Attorney, Agent, or Firm* — David Coppiellie; Carlson, Gaskey & Olds (57) ABSTRACT

An apparatus, for controlling a temperature of a vehicle component, such as of an internal combustion engine, by way of a cooling apparatus of the vehicle, includes a displaceable air guide, an actuator, a temperature sensor and a control unit. The control device is adapted so that a partially open air guide protection position is set at least temporarily below an external temperature threshold value for providing a frost warning. A related method is also disclosed.

20 Claims, 6 Drawing Sheets

(56) References Cited

U.S. PATENT DOCUMENTS

| | | | |
|---|---|---|---|
| 2012/0270490 A1* | 10/2012 | Turner | F01P 7/12 454/75 |
| 2013/0081888 A1* | 4/2013 | Charnesky | B60K 11/08 180/68.3 |
| 2013/0086839 A1* | 4/2013 | Klop | B60K 11/085 49/1 |
| 2013/0103265 A1* | 4/2013 | Remy | B60K 11/085 701/49 |
| 2013/0223980 A1 | 8/2013 | Pastrick et al. | |
| 2013/0247862 A1* | 9/2013 | Sakai | B60K 11/085 123/188.1 |
| 2014/0038507 A1* | 2/2014 | Abeska | F01P 7/12 454/75 |
| 2014/0039765 A1* | 2/2014 | Charnesky | F01P 7/10 701/49 |
| 2015/0197148 A1* | 7/2015 | Kobayashi | B60K 11/085 701/49 |
| 2015/0260442 A1 | 9/2015 | Ragazzi | |
| 2015/0343379 A1* | 12/2015 | Tomimatsu | B01D 53/8675 422/111 |

* cited by examiner

APPARATUS AND METHOD FOR CONTROLLING A TEMPERATURE OF A VEHICLE COMPONENT BY MEANS OF AIR GUIDE MEANS

TECHNICAL FIELD

This document relates to an apparatus and to a method for controlling a temperature of a vehicle component, such as of an internal combustion engine for example, by way of a cooling apparatus of the vehicle using at least one moving air guide which controls the cooling air stream and is designed such that it can be adjusted by way of an actuator in order to control the size of at least one air inlet opening and/or the flow of the cooling air stream. The actuator is connected to a temperature-dependent control device which has a temperature sensor for measuring an external temperature and a control unit for processing an external temperature threshold value for providing a frost warning.

BACKGROUND

In modern cooling systems, closing devices are used in order to render possible different levels of air flow through a radiator. For example, at a low external temperature or during a warm-up phase of an internal combustion engine, the air flow through the engine radiator can be controlled or regulated.

In winter, closing devices with slats or the like can be blocked by snow and ice, this potentially causing only ineffective cooling of the internal combustion engine and therefore potentially leading to a higher consumption of fuel or, under certain circumstances, even to damage to components due to overheating.

U.S. Pat. No. 8,662,569 B2, which describes an apparatus of the generic type, proposes a solution to this problem. An adjusting motor for setting air slats which control a cooling air stream can be operated using two different electric currents. Below an external temperature threshold value with a risk of freezing, a high electric current flows through the motor with a correspondingly higher force for forced movement of the slats, even if these are iced up. Both the motor and the adjusting components of the slats and the slats themselves have to be correspondingly dimensioned for very high forces.

Another apparatus with ice identification of a cooling apparatus with slats and an external temperature sensor is known from U.S. Pat. No. 9,103,265 B2. Here, a Hall sensor serves to detect a shutter position, so that an error signal can be output when slats are blocked. When the shutter is blocked by ice or is undesirably closed, a fan is switched on for cooling purposes, in order to prevent the engine from overheating.

US 2015/0 260 442 A1 describes a method for deicing an external region of a heat exchanger in a motor vehicle. Another method for avoiding freezing in a heat exchanger is known from JP 2013 208 938 A.

SUMMARY

An object of this document is to provide an improved apparatus of the generic type such that protection against slats or similar elements, which serve as an air guide and serve to control the cooling air stream, from icing up is provided by simple measures.

This object is achieved by an apparatus and, respectively, a method as specified in the following claims.

The apparatus and method provide, in a particularly efficient manner, a relatively simple, but highly effective, measure which protects an engine from overheating, even in the event of a fault in the air guide, or at least renders operation of the engine more efficient.

The protection position ensures that, when the slats or the like are iced up, the slats then ice up at least in this advantageous position. In the protection position in which the iced-up slats are located, firstly enough cooling air can reach the radiator so that the engine does not enter a critical overheated state if it were to heat up too quickly. Secondly, the cooling air is reduced, so that effective heating up of the engine is still possible and the consumption of fuel is optimized even in the protection position, for example by an improved aerodynamic behavior of the slats.

Additional measures can readily be taken in order to "release" the slats. However, before this is done, the only partially open air guide means protection position, in which a minimum level of air cooling is ensured, should be set at least temporarily below the external temperature threshold value for providing a frost warning.

The apparatus and method are based on the idea of, after parking, for example before a night frost sets in, or when there is a risk of icing up, permitting the slats to open to such an extent that a compromise is made between safety on the one hand (no overheating of the engine) and an improvement in the degree of efficiency (better heating up) on the other hand.

It would be conceivable to leave the slats fully open when there is a risk of icing up, but this would then mean undesirably severe cooling of the engine.

The protection position is therefore preferably not only set when the vehicle is in operation but also when it is in the inoperative mode, that is to say when the vehicle is deactivated by means of the ignition key or when the vehicle is switched to the inoperative mode.

As an alternative, the protection position can be set only in an inoperative mode.

Since the cooling apparatus is intended to be designed for a "worst-case" situation, the opening protection position is preferably set such that this situation is taken into account.

The apparatus and method take into account a low external temperature. Since icing up occurs particularly in damp conditions, further parameters, such as external moisture (use of a moisture or snow or rain sensor) or weather forecasts (weather sensors or weather information, for example via the Internet) can readily be included in the protection strategy. For example, the temperature threshold value does not have to be fixedly prespecified, but rather can be variable and depend on other parameters. The temperature threshold value can be set higher, for example at +3° C., when a cold front is underway, so that the slats can reliably reach the protection position even under unfavorable conditions.

The protection position, the heat exchanger and the opening required in the front end of the vehicle are dimensioned for the worst case, for example for a high speed, a high cargo load and/or a high trailer load.

In the protection position, the slats can guide so much air that they are sufficient for all or at least for the vast majority of driving conditions.

The apparatus and method also take into account the idea that a small opening for a low aerodynamic resistance and a large opening for sufficient cooling can be used under different driving conditions. This is ensured by the anti-icing protection.

Therefore, the apparatus and method ensure a minimum level of air cooling because, even when the slats ice up overnight, they ice up in the partially open protection position. Secondly, the slats limit the airflow in this position, so that sufficient heating up of the engine can still take place.

Therefore, an only partially open air guide position is set below the external temperature threshold value in order to prevent blocking of the moving air guide by ice and/or snow and/or in order to ensure emergency operation when the air guide is correspondingly blocked.

Further advantageous embodiments are described in the dependent claims.

According to a preferred embodiment of the apparatus, the air guide, which is designed as slats or as one or more flaps in particular, are active in a parking mode of the vehicle. Therefore, the protection strategy can be realized in the event of a night frost or under rapidly dropping temperatures. This means that the corresponding controller either must never be switched off or has to be activated or ramped up below the temperature threshold value. In order to protect the vehicle battery, a standby mode can be realized. The controller switches over to a control mode only when the temperature sensor emits a frost signal.

In another preferred embodiment of the apparatus, it is provided that the external temperature threshold value lies at 0° C. to +3° C., in particular at approximately +1° C. It is advantageous to set the threshold value just above the zero degree limit, so that reliable setting of the slats is still possible.

So that corresponding countermeasures, for example for deicing the slats, are possible, it is particularly advantageous when at least one blocking detection sensor for detecting a blocked state of the air guide is provided. That blocking detection sensor is preferably designed as a torque sensor. The torque sensor detects the situation of slats no longer being able to rotate about the corresponding axis. The torque sensor is preferably arranged on a slat shaft or on another drive shaft which is mechanically connected to the slat shaft. A plurality of torque sensors can also be arranged on different shafts.

A further advantageous embodiment of the apparatus is distinguished in that an anti-icing unblocking unit is provided. That anti-icing and unblocking unit is designed in such a way that it releases a blocked air guide, preferably by an anti-freeze agent deicing process and/or by a heating process. Therefore, it is possible to leave the protection position of the slats when the slats are fully mobile again owing to the frost-protection agent or owing to said slats being heated up.

Furthermore, it is advantageous when the control device is designed in such a way that the air guide is cyclically tested to check for a blocking state, preferably only below the temperature threshold value, by being opened and closed, or vice versa, by the actuator in order to detect a blocking state of the air guide. As a result, it is possible to take measures for deicing the slats only when said slats are actually iced up. Therefore, deicing is not always performed when the external temperature reaches the freezing range, but rather only when actually required. A corresponding signal "Slats blocked" can also be output in order to inform the driver of this situation. A corresponding check does not have to be limited to the freezing range, but rather can also take place at higher temperatures or for different causes of a fault, such as in the case of slats which are blocked by dirt or by other objects or in the event of a breakdown in the slat drive.

It is particularly advantageous when the air guide protection position comprises a 20%- to 40%-open state, preferably an approximately 30%-open state, of the air guide.

The opening state in % can relate to an air inlet area in percent. When the slats are closed, the area can be 0%. When the slats are completely open, the area can be 100%. In between these points, the air inlet area which is critical for a volume flow can be reduced in percent. The opening area in the protection position is 0.09 m$^2$ (30%) given a maximum effective air inlet area of 0.3 m$^2$.

The opening state in % can relate to a change in angle in percent. When the slats are closed, the angle can be 0°. When the slats are completely open, the angle can be 90°. In between these points, the slat angle which is critical for a volume flow can be reduced in percent. The slat angle is 54° (30%) in the protection position.

The opening state in % can relate to a volume flow value, a physical cooling value or else to a different parameter.

In an advantageous refinement of the solution, it is provided that the cooling apparatus is formed as a liquid radiator, in particular as a water radiator, and the vehicle component to be cooled is an internal combustion engine of a motor vehicle.

It is advantageous to check whether the external temperature lies below the external temperature threshold value. A control instruction to open the air guide can be output when the external temperature falls below an external temperature threshold value. After the control instruction to open the air guide has been output, it is possible to check whether the air guide is set in accordance with a setpoint value. If the slats are operating correctly, the check can be repeated after a certain time. If, however, the air guide is not set in accordance with the setpoint value, the slats are presumed to be iced up. In this case, an error signal can be output and/or countermeasures can be taken.

BRIEF DESCRIPTION OF THE DRAWING FIGURES

Exemplary embodiments of the apparatus will be explained in more detail below with reference to the drawings, in which.

DETAILED DESCRIPTION

Figure 1:
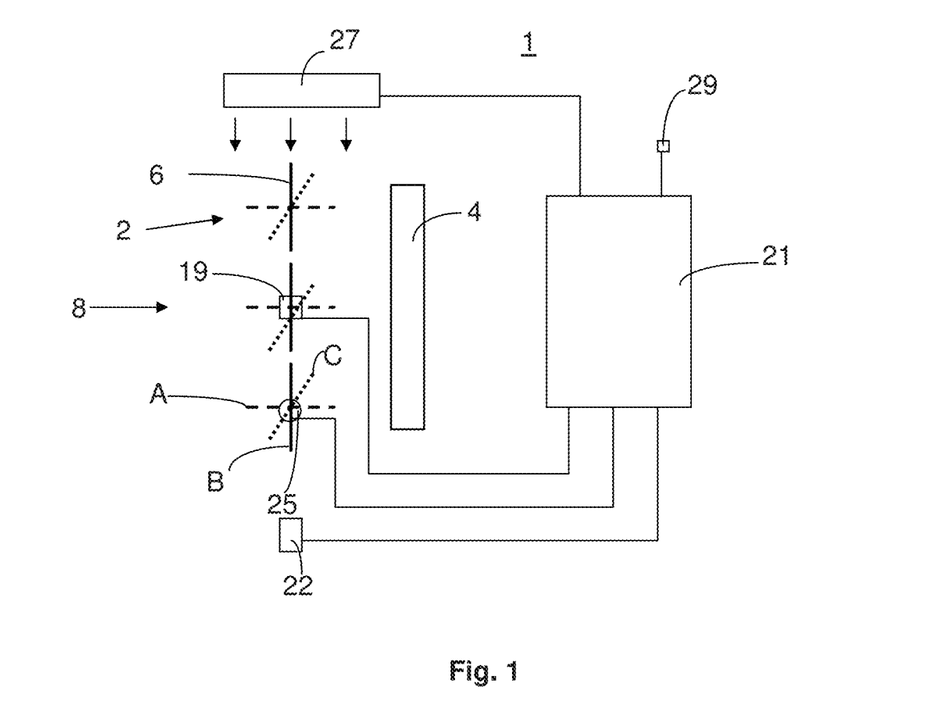
FIG. 1 shows a schematic illustration of the new and improved apparatus.

FIG. 1 shows an exemplary embodiment of the new and improved apparatus 1 according to the invention. The apparatus 1 serves to control a temperature, for example an operating temperature, of a vehicle component 3 shown in FIG. 2 which is an internal combustion engine in the exemplary embodiment. The internal combustion engine 3 is connected to a cooling apparatus 4 or to a radiator by means of a coolant line 20. The operating temperature is controlled by the cooling apparatus 4 of the vehicle 5 using a plurality of slats 6 (air guide 2) which control a cooling air stream 8 and control the size of at least one air inlet opening 7 (FIG. 2) and/or the flow of the cooling air stream 8. The slat arrangement forms a shutter.

In FIG. 1, "A" identifies a slat position at a high temperature if maximum engine cooling is required. A high level of engine cooling may be required, for example, at high ambient temperatures, in the case of a steep slope of the roadway or a high trailer load, such as when a mobile home is attached or for another goods trailer. This slat position renders it possible for the air entering the front region of the vehicle 5 to be deflected in the direction of cooling lines in the cooling apparatus 4, called only radiator for short in the text which follows.

The slats 6 are advantageously positioned in a streamlined manner, for example horizontally, at a high speed, this reducing the consumption of fuel.

In FIG. 1, "B" identifies a slat position at a low temperature when the slats are not iced up, for example in the winter or if the internal combustion engine is in the start phase and is still cold. In this case, minimal engine cooling is desired. Owing to the then minimized free space between the slats 6, an effective air inlet opening is minimized because the slats 6 are vertical.

Figure 2:
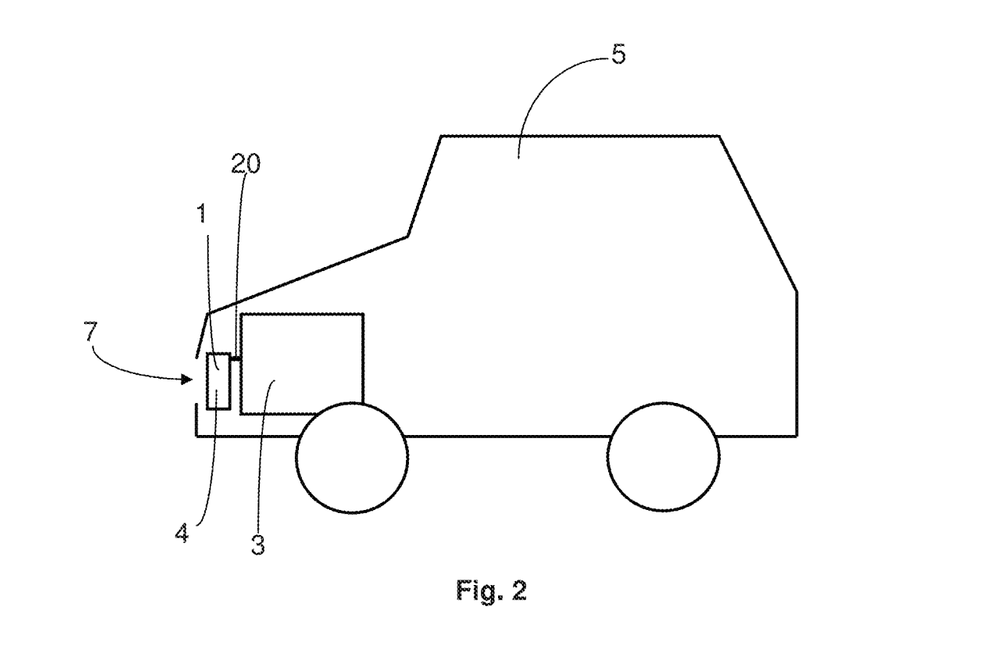
FIG. 2 shows a schematic illustration of a motor vehicle comprising a cooling system.

The apparatus 1 constitutes an arrangement for a liquid radiator, in particular a water radiator, comprising cooling ducts 11 for cooling the internal combustion engine which is identified as component 3 in FIG. 2. This cooling principle can also be applied to other cooling arrangements of the vehicle or else to components of an electric vehicle. The vehicle can be a passenger car, truck, motorcycle, bus, mobile home or the like.

The slats 6 serve to control or regulate an operating temperature or an air flow or an air inflow and for temperature-, speed- and/or load-dependent cooling of the cooling water and therefore of the internal combustion engine 3 of the vehicle 5.

The slats 6 are arranged on a slat support part 18 (FIGS. 3 and 4) or a radiator grille, a radiator housing or the like.

The temperature is therefore controlled by using the slats 6 which control the cooling air stream 8 and serve as air guide 2. The slats 6 can be adjusted by an actuator 25, where said actuator is identified only on the bottom slat 6 in FIG. 1 for reasons of simplifying the drawing. The actuator 25 rotates all of the slats 6 simultaneously or synchronously. The effective passage cross section of at least the air inlet opening 7 and/or the flow of the cooling air stream can be controlled in this way.

Figure 10:
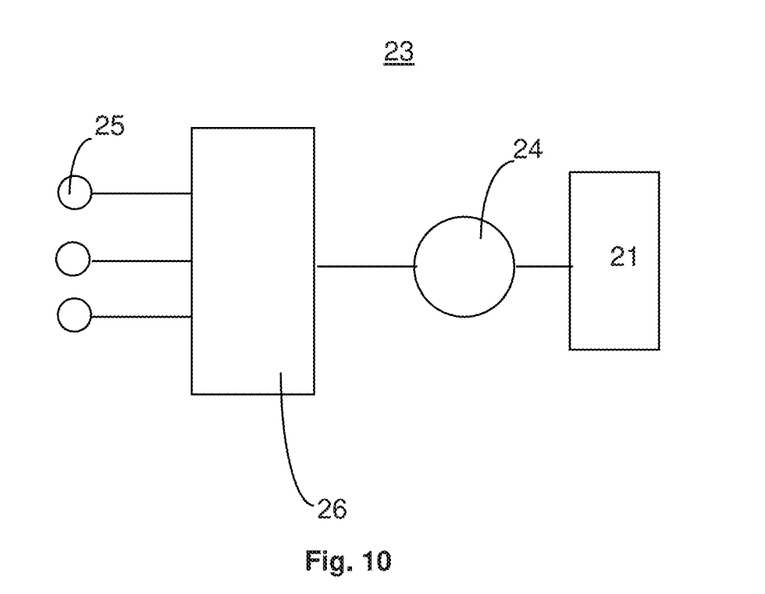
FIG. 10 shows a schematic illustration of a control device of the apparatus.

As shown in FIG. 1, the mechanical actuator 25 is connected to a temperature-dependent control device 23 (FIG. 10). The control device 23 comprises a control unit 21 and an electric motor 24 or a comparable drive which moves all of the slats 6 at the same time by means of a gear assembly 26 or a comparable solution and is controlled by the electrical or electronic control unit 21. The control unit 21 is connected to a temperature sensor 22 for measuring an external temperature and is designed for processing an external temperature threshold value for providing a frost warning.

Figure 3:
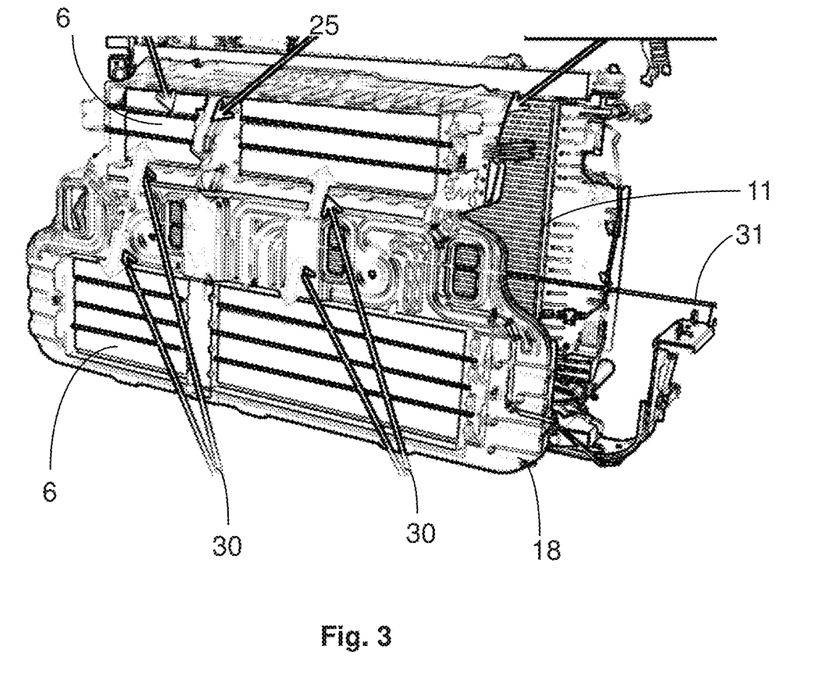
FIG. 3 shows a perspective illustration of a radiator comprising slats.

The actuator 25 can be a drive shaft which is connected to the motor 24 by means of a gear or another drive means. The actuator 25 can be integrated in the slat arrangement, as shown in FIG. 3.

A main sensor 29 for measuring the temperature of the engine 3 is connected to the control unit 21 for the purpose of controlling the slats during normal operation.

The control device 23 or the control unit 21 is designed in such a way that an only partially open air guide protection position, as identified by "C" in FIG. 1, is at least temporarily set below the external temperature threshold value for providing a frost warning.

The slats 6 are only partially open in position C, so that a sufficient gap between the slats and therefore a minimum level of air cooling are ensured in the protection position. Said gap allows cooling air to enter the radiator 4, so that the situation of a critical engine temperature being reached is avoided, even under unfavorable conditions, such as in the case of a trailer load, a slope or the like.

However, secondly, the slats 6 are partially closed in the position C, so that air cooling is considerably reduced in comparison to the position A in order to optimize operation of the internal combustion engine to be cooled. The optimum situation is when a temperature increase in the engine runs more rapidly, that is to say approximately 1.5 to four times as sharply in comparison to the position A for example, in the first minutes after the engine is started.

The control device 23 is designed in such a way that a corresponding protection position setting of the slats 6 is active in a parking mode of the vehicle 5. When the engine 3 is switched off, for example by operating an ignition key, a control instruction, which moves the slats 6 to the position C and allows them to remain there, can be made if the temperature sensor 22 outputs a temperature value of at most approximately +1° C.

As illustrated in FIG. 1, a blocking detection sensor 19 for detecting a blocked state of the slats is further provided. Said blocking detection sensor can be designed as a torque sensor. The sensor 19 measures the torque of the actuator 25 or a corresponding actuator element which can be an operating shaft or another rotatable part. An error signal is output if the torque lies above a threshold value. As an alternative, the current of the motor 24 can be measured, said current increasing when the slats are frozen. An error signal can be output if the current lies above a threshold value. The motor 24 can therefore serve as a sensor at the same time.

Figure 5:
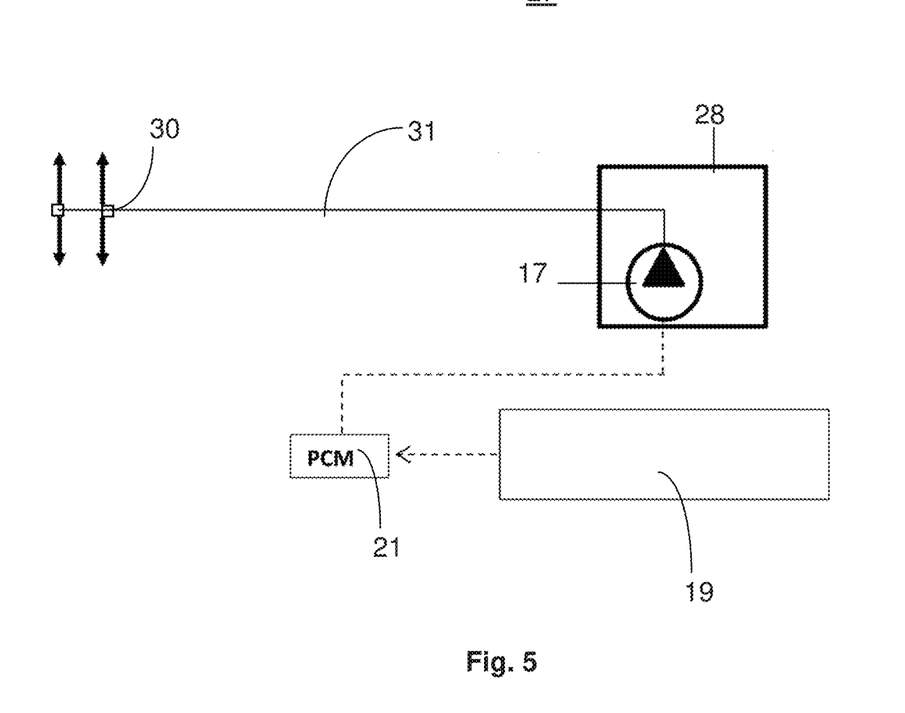
FIG. 5 shows a schematic illustration of a first exemplary embodiment of a deicing system for the apparatus.
Figure 6:
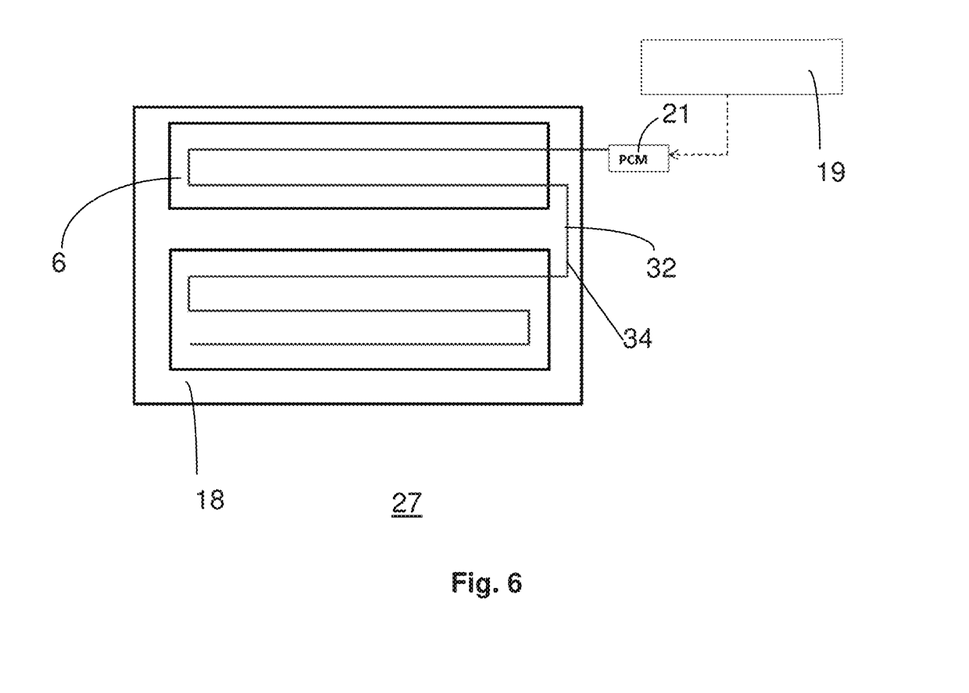
FIG. 6 shows a schematic illustration of a second exemplary embodiment of a deicing system for the apparatus.
Figure 7:
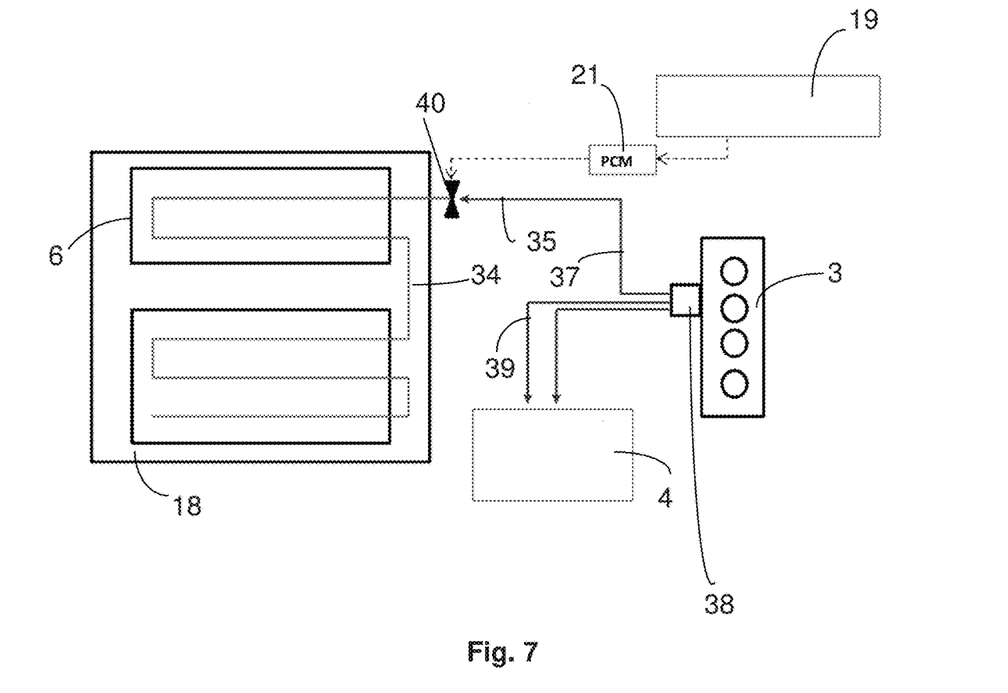
FIG. 7 shows a schematic illustration of a third exemplary embodiment of a deicing system for the apparatus.
Figure 8:
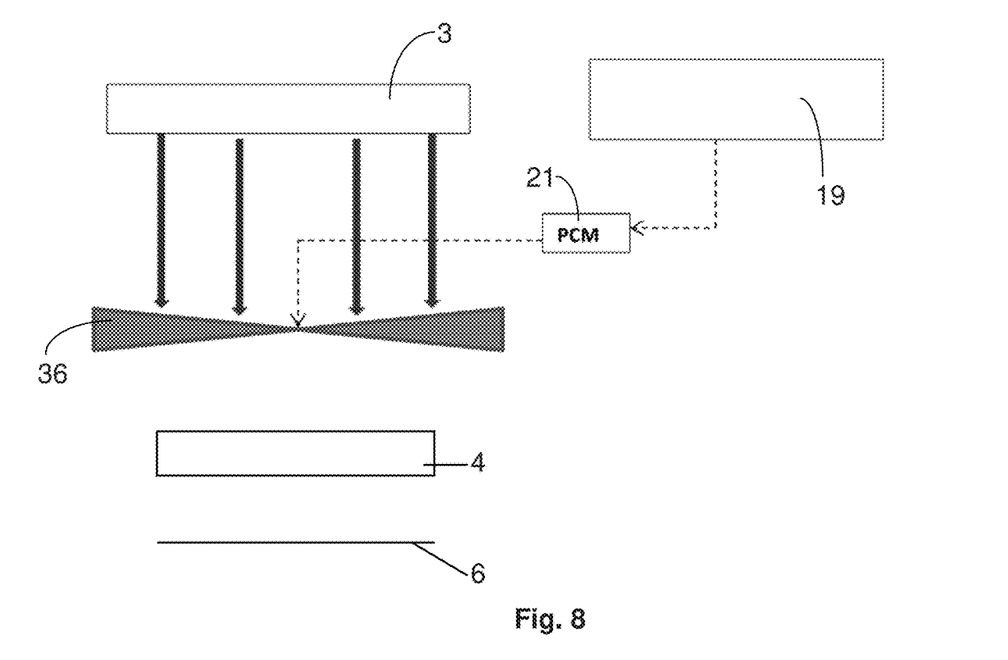
FIG. 8 shows a schematic illustration of a fourth exemplary embodiment of a deicing system for the apparatus.

The apparatus is provided with an anti-icing unblocking unit 27 (FIG. 1) which is connected to the control unit 21. The anti-icing unblocking unit 27 is designed to melt the ice and/or the snow which causes the blocking. Embodiments of this unit 27 are shown in FIGS. 5 to 8. Said unit is designed in such a way that slats 6 which are blocked by ice or by snow are released by an anti-freeze agent deicing process, as shown in FIG. 5, or by a heating process, as shown in FIGS. 6 to 8.

In the variant according to FIG. 5, the unit 21 is designed as a frost-protection agent spraying unit. The unit 21 comprises a frost-protection agent container or tank 28, a pump 17 which can be integrated in the tank 28, and nozzles 30 which are directed in the direction of the slats 6, as shown in FIG. 3. The nozzles 30 are connected to a frost-protection agent line 31 which leads to the tank 28. The pump 17 is controlled by the unit 21. The tank 28 can be the wiping water tank. As an alternative, a spray can solution with a controllable pressure valve can serve for deicing purposes or another type of spraying can be selected. After the spraying operation, the blocking detection sensor 19 can be used in order to establish whether the action was successful. This process can be repeated until the slats 6 move.

As an alternative or in addition, a principle operating by heat supply according to FIGS. 6 to 8 can also be used for deicing purposes.

Figure 4:
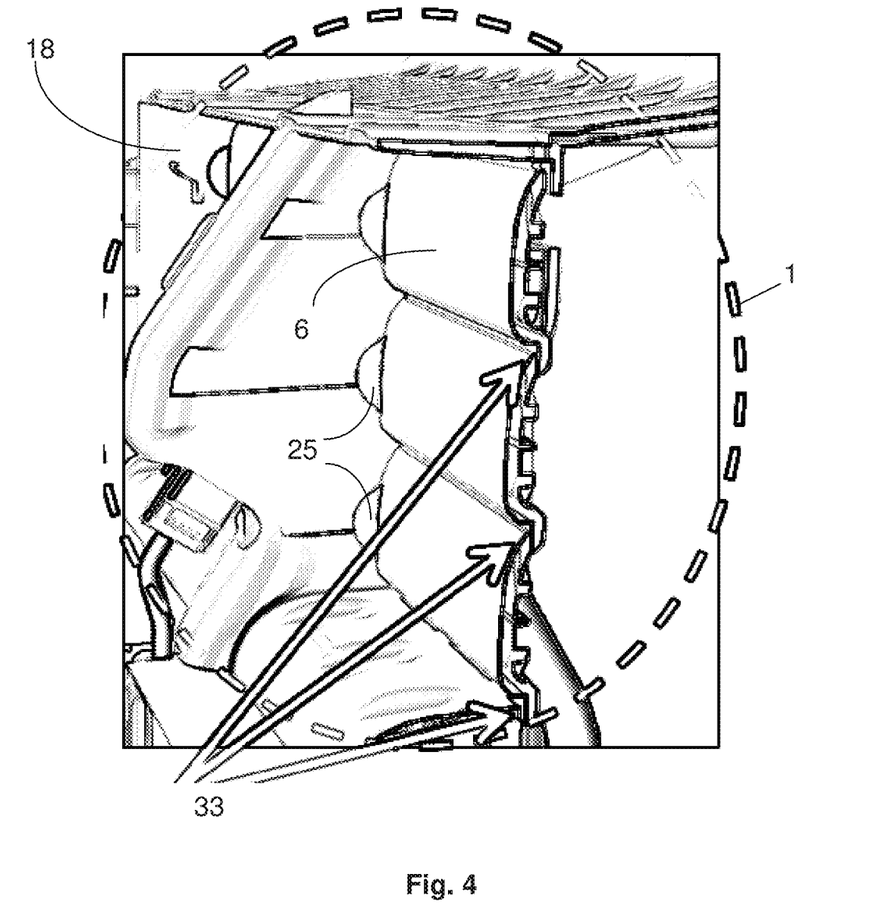
FIG. 4 shows an enlarged perspective illustration of the slats.

FIG. 6 shows a first variant of the anti-icing unblocking unit 27 comprising heating elements 32, such as heating wires 32 which are integrated in the slats 6 for example. The heating elements can be heated using current, analogously to a windshield defrosting arrangement, and are arranged at freezing points 33, preferably at the touching slat ends, as shown in FIG. 4. The current is controlled by the control unit 21.

FIG. 7 shows a solution with tubular heating elements 34 which can be heated by a—preferably liquid—heating agent 35. The radiator 4 is connected to the engine 3 by way of cooling lines 39. The coolant of the radiator 4 or a separate heating agent 35 can be provided for deicing purposes. An electric and/or hydraulic valve 40, which is connected to the control unit 21 and the supply line 37, controls the heat supply to the slats 6. The line 37 can be connected to the engine 3 or to the radiator 4. A thermostat 38, which is also connected to the line 37, is provided in this arrangement.

FIG. 8 shows a deicing principle in which a fan 36, in particular a radiator fan of the radiator 4, is used, specifically with a reversed direction of rotation. The fan 36 is arranged between the engine 3 and the slats 6. Owing to the reversal in the direction of rotation, hot engine air is blown into the slat arrangement, so that said slat arrangement can deice. As an alternative, the fan 36 can be an electric fan heater. Said electric fan heater is connected to the control unit 21.

The apparatus 1 can therefore be formed in such a way that an anti-icing unblocking unit 27 is provided which is formed in such a way that it can release the slats 6 by virtue of an anti-freeze agent deicing process (cf. FIG. 5).

The apparatus 1 can also be formed in such a way that an anti-icing unblocking unit 27 is provided, which is designed in such a way that it releases the slats 6 by virtue of the action of heat (cf. FIGS. 6 to 8).

The apparatus 1 can also be formed in such a way that the anti-icing unblocking unit 27 comprises heating elements which release the slats 6 by virtue of a heating-up process (cf. FIGS. 6 and 7).

The apparatus 1 can also be formed in such a way that the heating elements are integrated in the air guide 2 (cf. FIGS. 6 and 7).

The apparatus 1 can also be formed in such a way that the heating elements are designed as electrical heating elements (cf. FIG. 6).

The apparatus 1 can also be formed in such a way that the heating elements are designed as heating ducts through which a heating agent, which is preferably heated by the component, flows (cf. FIG. 7).

The apparatus 1 can also be formed in such a way that a heating air flow, which is heated by the engine 3, is blown by a fan 36 to the air guide 2 in order to deice the slats 6 (cf. FIG. 8).

Figure 9:
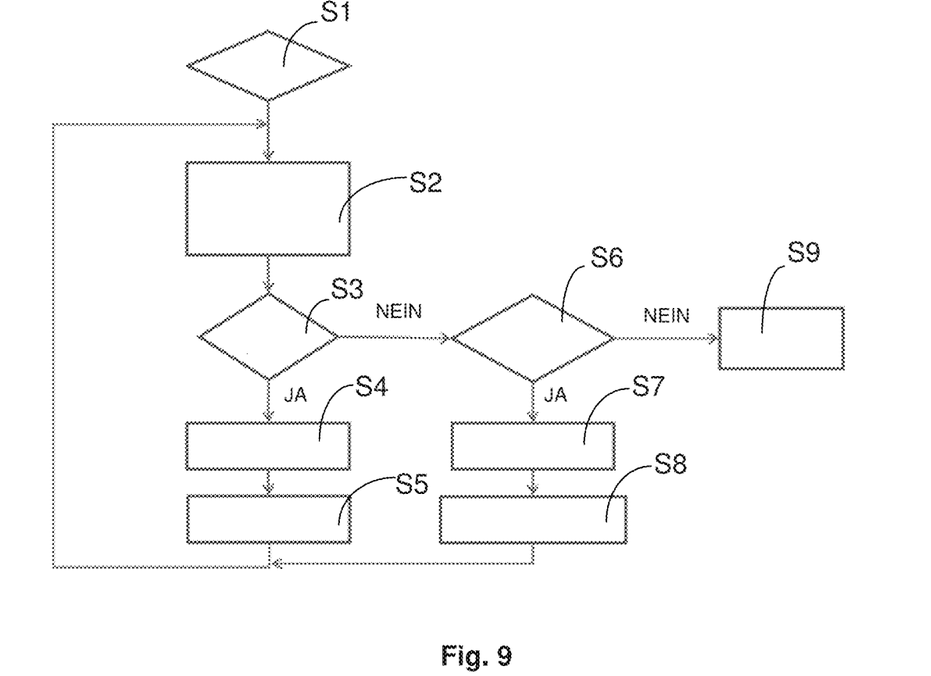
FIG. 9 shows a flowchart of a deicing checking method.

FIG. 9 illustrates a method for cyclically testing an iced-up state of the slats 6.

The control device 23 is designed in such a way that the slats 6 are cyclically tested to check for a blocking state. This test is performed only below the temperature threshold value. An attempt is made to open and to close, or vice versa, the slats 6 by way of the actuator 25. If this is successful, the slats 6 are not iced up. However, if the slats 6 do not follow the control device, they are blocked. This can be established by the sensor 19.

In S1 in FIG. 9, measurement by the sensor 22 checks whether the temperature threshold value of +1° C. is present or undershot.

If yes, the slats 6 are then moved to the 100% position (fully open) and back to the starting position (30%) in S2.

If the test (S3) is successful, no deicing measures are initiated (S4). The test is repeated (S2) after a waiting time (S5) of x seconds.

If an error signal "Slats iced up" is output (NO in S3), a deicing measure is then initiated (S7) and, beforehand, a counter value, which counts the attempts, is compared (S6) with a maximum counter value (maximum number of attempts).

If the counter value is lower than the maximum value (YES in S6), a (repeated) deicing measure is then carried out (S7) and the counter value is increased (S8) by one. Another check (S2) is made. If the counter value reaches the maximum value, an error message "Deicing not possible" (S9) follows.

Therefore, the steps of:
checking whether the external temperature lies below the external temperature threshold value (or is equal to this threshold value),
outputting a control instruction to open the air guide when the external temperature falls below an external temperature threshold value,
checking, after the control instruction to open the air guide has been output, whether the air guide means is set in accordance with a setpoint value,
when the air guide is set in accordance with a setpoint value, repeating the checking process after a defined cycle time,
when the air guide is not set in accordance with a setpoint value, repeating a deicing process until it is successful or a maximum value for attempts is reached are applied.

The apparatus 1 for controlling a temperature with an air guide protection position C is not restricted to the exemplary embodiments shown. Cooling is not restricted to an internal combustion engine. The apparatus can also be used for cooling a climate-control system or A/C component, in particular a climate-control system condenser, for battery cooling, cooling fuel cell components or the like.

What is claimed:

1. A method for controlling a temperature of a vehicle component, comprising:
checking whether an external temperature lies below an external temperature threshold value;
outputting a control instruction to open an air guide when the external temperature falls below the external temperature threshold value;
checking, after the control instruction to open the air guide has been output, whether the air guide is set in accordance with a setpoint value;
when the air guide is set in accordance with a setpoint value, repeating the checking process after a defined cycle time; and
when the air guide is not set in accordance with a setpoint value, repeating a deicing process until it is successful or a maximum value for attempts is reached,
wherein the deicing process includes directing a frost protection agent onto the air guide to melt ice and snow and unblock the air guide.

2. An apparatus for controlling a temperature of a vehicle component, comprising:
a displaceable air guide configured to control a cooling air stream;

an actuator configured to displace the displaceable air guide;

a temperature sensor for measuring an external temperature;

a control unit configured to compare the external temperature to an external temperature threshold value for providing a frost warning and, in response to the external temperature falling below the external temperature threshold value, set said displaceable air guide into a partially open air guide protection position so that a minimum level of air cooling is ensured; and an anti-icing unblocking unit adapted to melt ice and snow and unblock the displaceable air guide, wherein the anti-icing unblocking unit includes a pump and at least one nozzle to direct a frost protection agent onto the displaceable air guide, or the anti-icing unblocking unit includes at least one of an electrical heating element integrated into the displaceable air guide and a heating duct carried on the displaceable air guide and a heating agent flowing through the heating duct.

3. The apparatus of claim 2, wherein said external temperature threshold value lies at 0° C. to +3° C.

4. The apparatus of claim 3, further including a blocking detection sensor adapted for detecting a blocked state of the displaceable air guide.

5. The apparatus of claim 4, wherein said control unit is configured to control operation of said anti-icing unblocking unit.

6. The apparatus of claim 5, wherein said control unit is configured to test the air guide for a blocking state by displacing said air guide between an open position and a closed position when the external temperature is below the external temperature threshold value.

7. The apparatus of claim 6, wherein the blocking detection sensor is a torque sensor.

8. An apparatus for controlling a temperature of a vehicle component by way of a cooling apparatus of the vehicle, comprising:

at least one moving air guide that controls a size of at least one air inlet opening and a flow of a cooling air stream to the cooling apparatus;

an actuator adapted for displacing the at least one moving air guide;

a control device including an electrical control unit connected to a temperature sensor measuring an external temperature, said control device being adapted for (a) comparing a measured external temperature to an external temperature threshold value and (b) setting the at least one moving air guide into a partially open air guide protection position in response to the measured external temperature falling below the external temperature threshold, whereby air cooling is reduced but a minimum level of cooling is ensured; and a blocking detection sensor adapted to detect a blocked state of the at least one moving air guide.

9. The apparatus as claimed in claim 8, wherein the control device is adapted so that a corresponding protection position setting for the air guide, which is designed in particular as at least one slat or as at least one flap, is active in a parking mode of the vehicle.

10. The apparatus as claimed in claim 8, wherein the external temperature threshold value lies at 0° C. to +3° C.

11. The apparatus as claimed in claim 8, wherein the external temperature threshold value lies at +1° C.

12. The apparatus as claimed in claim 8, wherein the blocking detection sensor is a torque sensor.

13. The apparatus as claimed in claim 8, comprising an anti-icing unblocking unit adapted to release a blocked air guide by an anti-freeze agent deicing process and/or by a heating process.

14. The apparatus as claimed in claim 13, wherein the control device is adapted to cyclically test to check for a blocking state, preferably only below the temperature threshold value, by being opened and closed by the actuator in order to detect a blocking state of the air guide.

15. The apparatus as claimed in claim 14, wherein the air guide protection position comprises a 20%- to 40%-open state of the air guide.

16. The apparatus as claimed in claim 15, wherein the cooling apparatus is formed as a liquid radiator, and wherein the vehicle component to be cooled is an internal combustion engine of a motor vehicle.

17. A method using an apparatus as claimed in claim 8, wherein a partially open air guide protection position is set at least temporarily below an external temperature threshold value.

18. The apparatus of claim 8, comprising an anti-icing unblocking unit adapted to melt ice and snow and unblock the at least one moving air guide, wherein the anti-icing unit includes a pump and at least one nozzle to direct a frost protection agent onto the at least one moving air guide.

19. The apparatus of claim 8, comprising an anti-icing unblocking unit adapted to melt ice and snow and unblock the at least one moving air guide, wherein the anti-icing unit includes an electrical heating element integrated into the at least one moving air guide or a heating duct carried on the at least one moving air guide and a heating agent flowing through the heating duct.

20. The apparatus of claim 8, wherein the blocking detection sensor is a torque sensor configured to measure a torque of a rotatable part of the actuator.

* * * * *